(12) United States Patent
Jang et al.

(10) Patent No.: US 10,819,987 B2
(45) Date of Patent: Oct. 27, 2020

(54) METHOD AND APPARATUS FOR COEFFICIENT INDUCED INTRA PREDICTION IN IMAGE CODING SYSTEM

(71) Applicant: LG ELECTRONICS INC., Seoul (KR)

(72) Inventors: Hyeongmoon Jang, Seoul (KR); Bumshik Lee, Seoul (KR); Sehoon Yea, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 241 days.

(21) Appl. No.: 15/775,307

(22) PCT Filed: Nov. 11, 2016

(86) PCT No.: PCT/KR2016/012998
§ 371 (c)(1),
(2) Date: May 10, 2018

(87) PCT Pub. No.: WO2017/082670
PCT Pub. Date: May 18, 2017

(65) Prior Publication Data
US 2018/0343455 A1  Nov. 29, 2018

Related U.S. Application Data

(60) Provisional application No. 62/254,669, filed on Nov. 12, 2015.

(51) Int. Cl.
*H04N 19/18* (2014.01)
*H04N 19/159* (2014.01)
(Continued)

(52) U.S. Cl.
CPC .......... *H04N 19/18* (2014.11); *H04N 19/105* (2014.11); *H04N 19/11* (2014.11); *H04N 19/119* (2014.11);
(Continued)

(58) Field of Classification Search
CPC ....... H04N 19/105; H04N 19/18; H04N 19/50
See application file for complete search history.

(56) References Cited

U.S. PATENT DOCUMENTS

| | | | | |
|---|---|---|---|---|
| 2012/0057630 A1* | 3/2012 | Saxena | ................ | H04N 19/176 375/240.03 |
| 2012/0093426 A1* | 4/2012 | Sato | ..................... | H04N 19/176 382/233 |

(Continued)

FOREIGN PATENT DOCUMENTS

| | | |
|---|---|---|
| EP | 2651137 A2 | 10/2013 |
| EP | 3376764 A1 | 9/2018 |

(Continued)

*Primary Examiner* — Mainul Hasan
(74) *Attorney, Agent, or Firm* — Dentons US LLP

(57) ABSTRACT

An intra prediction method according to the present invention comprises the steps of: determining an intra prediction mode for a current block; determining whether to apply a coefficient induced intra prediction (CIIP) to the current block; deriving neighboring reference samples for the current block on the basis of whether the CIIP is applied; and generating prediction samples for the current block on the basis of the intra prediction mode and the neighboring samples. The present invention can generate modified or improved neighboring reference samples and thereby can improve the performance of intra prediction.

10 Claims, 11 Drawing Sheets

(51) Int. Cl.
  *H04N 19/176* (2014.01)
  *H04N 19/124* (2014.01)
  *H04N 19/44* (2014.01)
  *H04N 19/119* (2014.01)
  *H04N 19/11* (2014.01)
  *H04N 19/105* (2014.01)
  *H04N 19/61* (2014.01)
  *H04N 19/50* (2014.01)

(52) U.S. Cl.
  CPC ......... *H04N 19/124* (2014.11); *H04N 19/159* (2014.11); *H04N 19/176* (2014.11); *H04N 19/44* (2014.11); *H04N 19/45* (2014.11); *H04N 19/50* (2014.11); *H04N 19/61* (2014.11)

(56) References Cited

U.S. PATENT DOCUMENTS

| | | | | |
|---|---|---|---|---|
| 2012/0201297 A1* | 8/2012 | Lim | | H04N 19/44 375/240.03 |
| 2013/0039415 A1* | 2/2013 | Kim | | H04N 19/177 375/240.12 |
| 2013/0039421 A1* | 2/2013 | Lee | | H04N 19/44 375/240.13 |
| 2014/0056352 A1* | 2/2014 | Park | | H04N 19/117 375/240.12 |
| 2014/0105290 A1* | 4/2014 | Kwon | | H04N 19/11 375/240.12 |
| 2014/0205000 A1* | 7/2014 | Lee | | H04N 19/44 375/240.02 |
| 2014/0211845 A1* | 7/2014 | Lei | | H04N 19/117 375/240.02 |
| 2015/0023405 A1* | 1/2015 | Joshi | | H04N 19/593 375/240.02 |
| 2018/0160113 A1* | 6/2018 | Jeong | | H04N 19/593 |
| 2019/0306511 A1* | 10/2019 | Jang | | H04N 19/11 |

FOREIGN PATENT DOCUMENTS

| | | |
|---|---|---|
| KR | 20130029130 A1 | 3/2013 |
| KR | 20130056190 A | 5/2013 |
| KR | 20130126928 A | 11/2013 |
| KR | 101453897 B1 | 10/2014 |
| KR | 20150024440 A | 3/2015 |

\* cited by examiner

METHOD AND APPARATUS FOR COEFFICIENT INDUCED INTRA PREDICTION IN IMAGE CODING SYSTEM

CROSS-REFERENCE TO RELATED APPLICATIONS

This application is the National Stage filing under 35 U.S.C. 371 of International Application No. PCT/KR2016/012998, filed on Nov. 11, 2016, which claims the benefit of U.S. Provisional Application No. 62/254,669 filed on Nov. 12, 2015, the contents of which are all hereby incorporated by reference herein in their entirety.

BACKGROUND OF THE INVENTION

Field of the Invention

The present invention relates to an image coding technique, and more particularly, to a method and apparatus for coefficient induced intra prediction in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and apparatus for increasing intra prediction efficiency.

The present invention also provides a method and apparatus for generating an intra prediction sample by using a transform coefficient of a neighboring block.

The present invention also provides a method and apparatus for deriving a neighboring reference sample by applying a scaling matrix to transform coefficients for a neighboring block, and generating an intra prediction sample on the basis of the neighboring reference sample.

The present invention also provides a method and apparatus for deriving non-available neighboring reference samples of a current block on the basis of a padding procedure.

According to an embodiment of the present invention, there is provided an intra prediction method performed by a decoding device. The intra prediction method includes: determining an intra prediction mode for a current block; determining whether to apply a coefficient induced intra prediction (CIIP) to the current block; deriving neighboring reference samples for the current block on the basis of whether to apply the CIIP; and generating prediction samples for the current block on the basis of the intra prediction mode and the neighboring reference samples.

According to another embodiment of the present invention, there is provided an intra prediction method performed by an encoding device. The intra prediction method includes: determining an intra prediction mode for a current block; determining whether to apply a CIIP to the current block; deriving neighboring reference samples for the current block on the basis of whether to apply the CIIP; generating prediction samples for the current block on the basis of the intra prediction mode and the neighboring reference samples; and encoding and outputting information on the intra prediction mode.

According to another embodiment of the present invention, there is provided a decoding device for performing intra prediction. The decoding device includes: a predictor for determining an intra prediction mode for a current block, determining whether to apply a CIIP to the current block, deriving neighboring reference samples for the current block on the basis of whether to apply the CIIP, and generating prediction samples for the current block on the basis of the intra prediction mode and the neighboring reference samples; and a memory for storing coding information for at least one neighboring block.

According to another embodiment of the present invention, there is provided an encoding device for performing intra prediction. The encoding device includes: a predictor for determining an intra prediction mode for a current block, determining whether to apply a CIIP to the current block, deriving neighboring reference samples for the current block on the basis of whether to apply the CIIP, and generating prediction samples for the current block on the basis of the intra prediction mode and the neighboring reference samples; and an entropy encoder for encoding and outputting information on the intra prediction mode.

According to the present invention, neighboring reference samples suitable for intra prediction of a current block can be derived, thereby improving intra prediction performance.

According to the present invention, unlike in the conventional technique in which a reconstructed sample of a neighboring block is used as neighboring reference samples for intra prediction of a current sample, modified or improved neighboring reference samples can be generated by applying coefficient induced intra prediction (CIIP) scaling to a transform coefficient of the neighboring block, thereby improving intra prediction performance.

DESCRIPTION OF EXEMPLARY EMBODIMENTS

Figure 1:
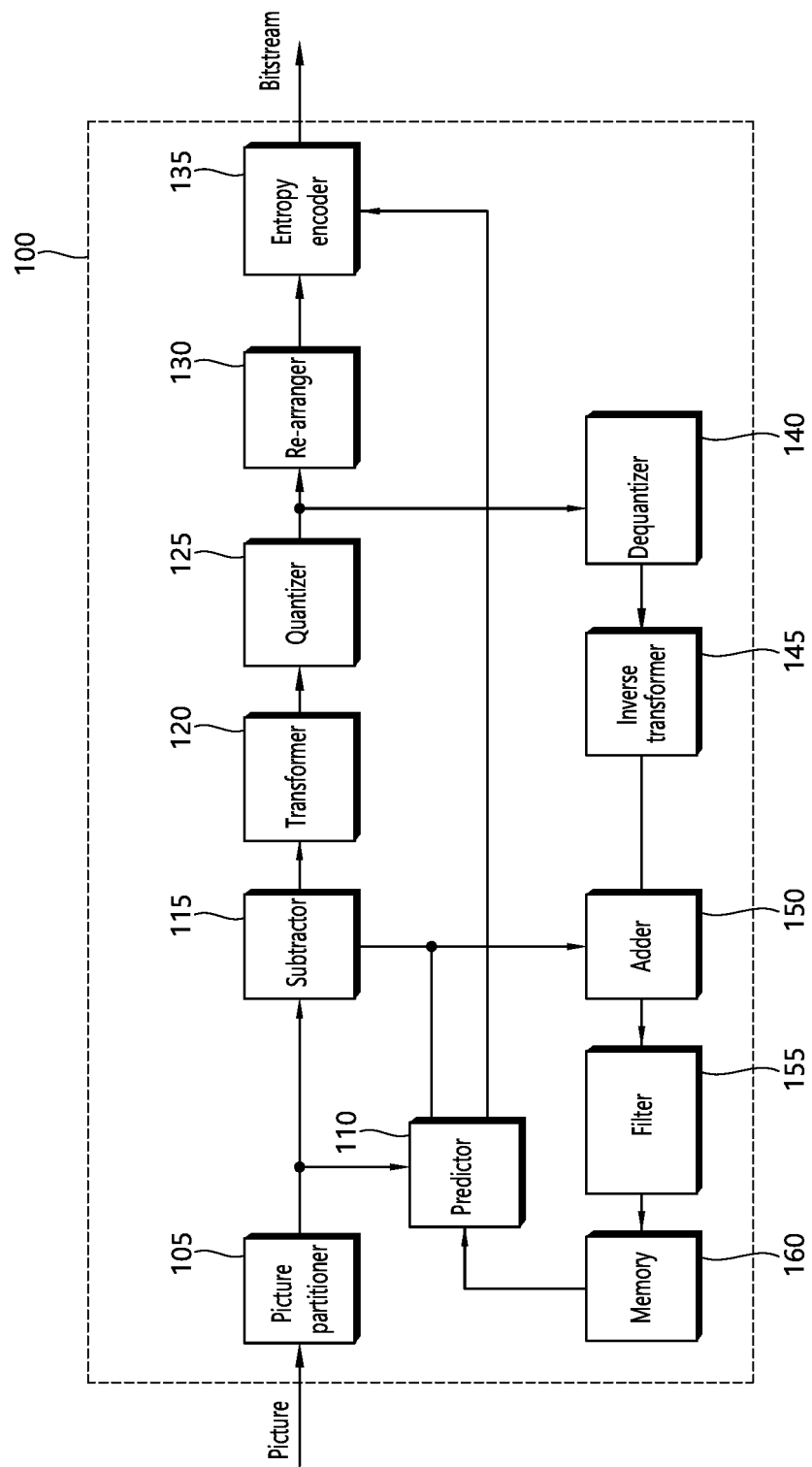
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit on the basis of coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block on the basis of a reference sample outside the current block in a picture to which the current block belongs (hereinafter, a current picture). In this case, the predictor 110 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block on the basis of a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned on the basis of a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transformer 120 transforms residual samples in units of a transform block to generate a transform coefficient. The transformer 120 may perform transformation on the basis of the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
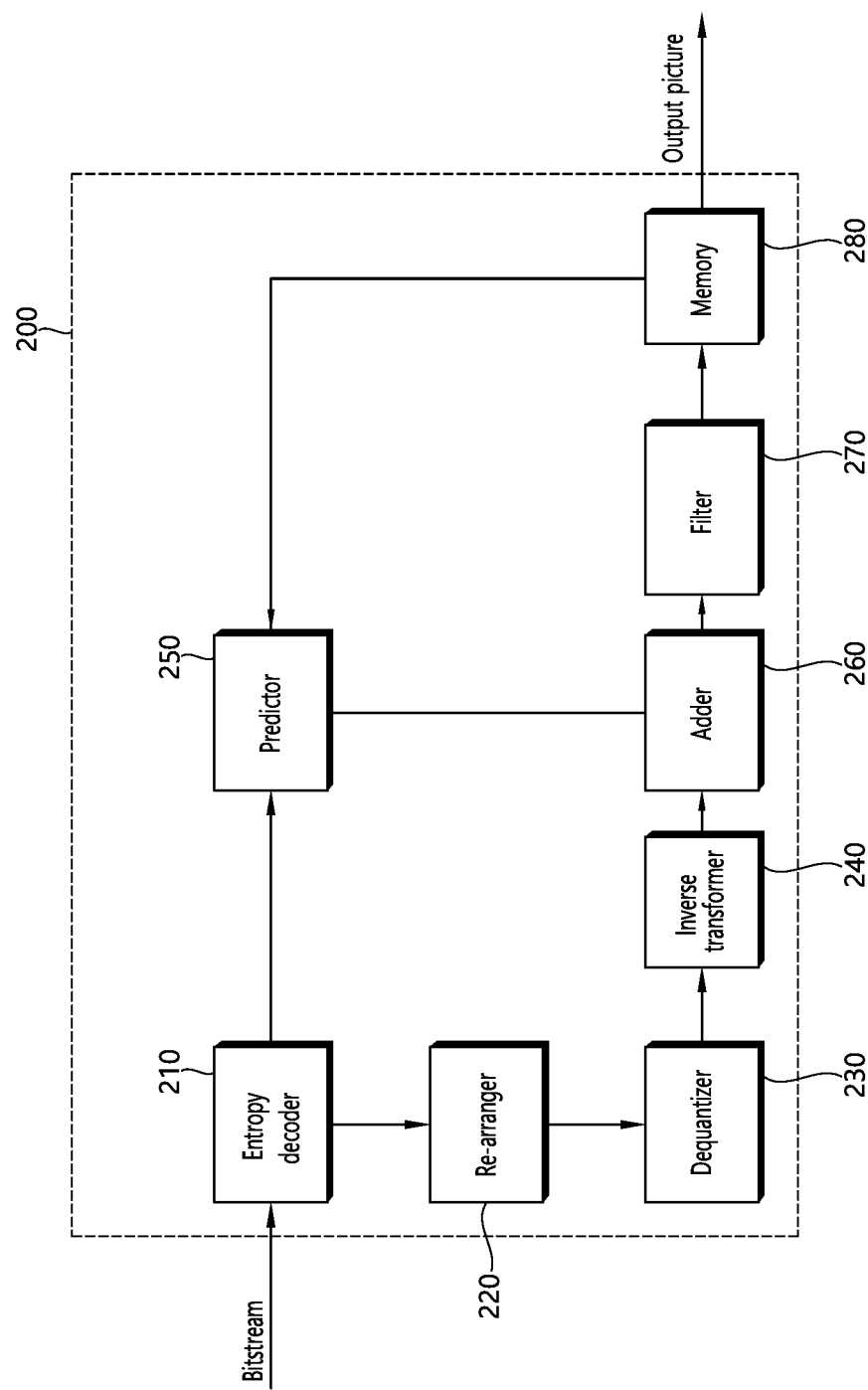
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream on the basis of a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients on the basis of a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block on the basis of a neighboring reference sample in a current picture. The predictor 250 may derive the prediction sample for the current block by applying a directional mode or a non-directional mode on the basis of the neighboring reference sample of the current block. In this case, a prediction mode to be applied to the current block may be determined by using an intra-prediction mode of a neighboring block.

In the case of inter-prediction, the predictor 250 may derive a prediction sample for a current block on the basis of a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived on the basis of the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion Vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

In video or picture coding, intra prediction or inter prediction may be applied as described above for coding efficiency. When the intra prediction is applied, for a current block, neighboring samples of the current block in a current picture may be utilizes as reference samples. However, when the intra prediction is performed on the current block on the basis of the neighboring samples, an error occurs inevitably to some extents, which causes an increase in a data amount for a residual signal, thereby decreasing coding efficiency.

Meanwhile, in the performing of the intra prediction, in order to increase intra prediction efficiency, modified neighboring samples may be derived to be used as reference samples instead of directly using the neighboring samples in the current picture. The modified neighboring samples may be derived by applying a scaling mask to transform coefficients including the neighboring samples. Hereinafter, a method of performing intra prediction by using the modified neighboring samples derived by applying the scaling mask to the transform coefficient of the neighboring block may be called coefficient induced intra prediction (CIIP). That is, in the intra prediction, the CIIP may generate residual samples modified for the neighboring block through inverse transform after applying the scaling mask to the transform coefficients of the neighboring block and generate the modified neighboring samples in the neighboring block on the basis of the modified residual samples, and thus may perform prediction on the current block by using the modified neighboring samples. In other words, the CIIP may be regarded as a method in which modified neighboring samples are derived by applying a scaling mask in a frequency domain for a neighboring block, and intra prediction is performed based on the modified neighboring samples, so that a prediction sample of a current block can be derived similarly to an original sample. The scaling mask may have a form of a Wiener filter. The scaling mask may be called a scaling matrix, and is a type of a filter applied in the frequency domain. The scaling matrix may be predetermined, and may be derived by using information learned based on a statistical characteristic between an original image and a prediction image in the frequency domain. A size of the scaling matrix may be equal to or smaller than a size of the transform coefficients. A procedure of applying the scaling mask to the transform coefficients may be called a CIIP scaling procedure. A modified neighboring sample having a value similar to a sample value of a current block can be derived based on the CIIP, thereby improving intra prediction performance.

Whether to apply the CIIP may be determined based on a CIIP flag. If the CIIP flag is 1, the CIIP scaling is applied to the transform coefficients of the neighboring block, the scaled transform coefficients are inversely transformed to generate modified residual samples, modified neighboring samples are derived based on the modified residual samples, and intra prediction for the current block is performed based on the modified neighboring samples (that is, prediction samples in the current block are generated). Herein, the neighboring block may be a block including at least one of neighboring (reference) samples for intra prediction of the current block. Alternatively, the neighboring block may be a block including at least one of neighboring samples selected according to a prediction mode applied to the current block among the neighboring samples for intra prediction of the current block.

Meanwhile, if the CIIP flag is 0, the intra prediction may be performed on the current block by using the existing reconstructed samples of a neighboring block as a neighboring reference sample of the current block.

A method of performing intra prediction by considering CIIP may be performed as follows.

Figure 3:
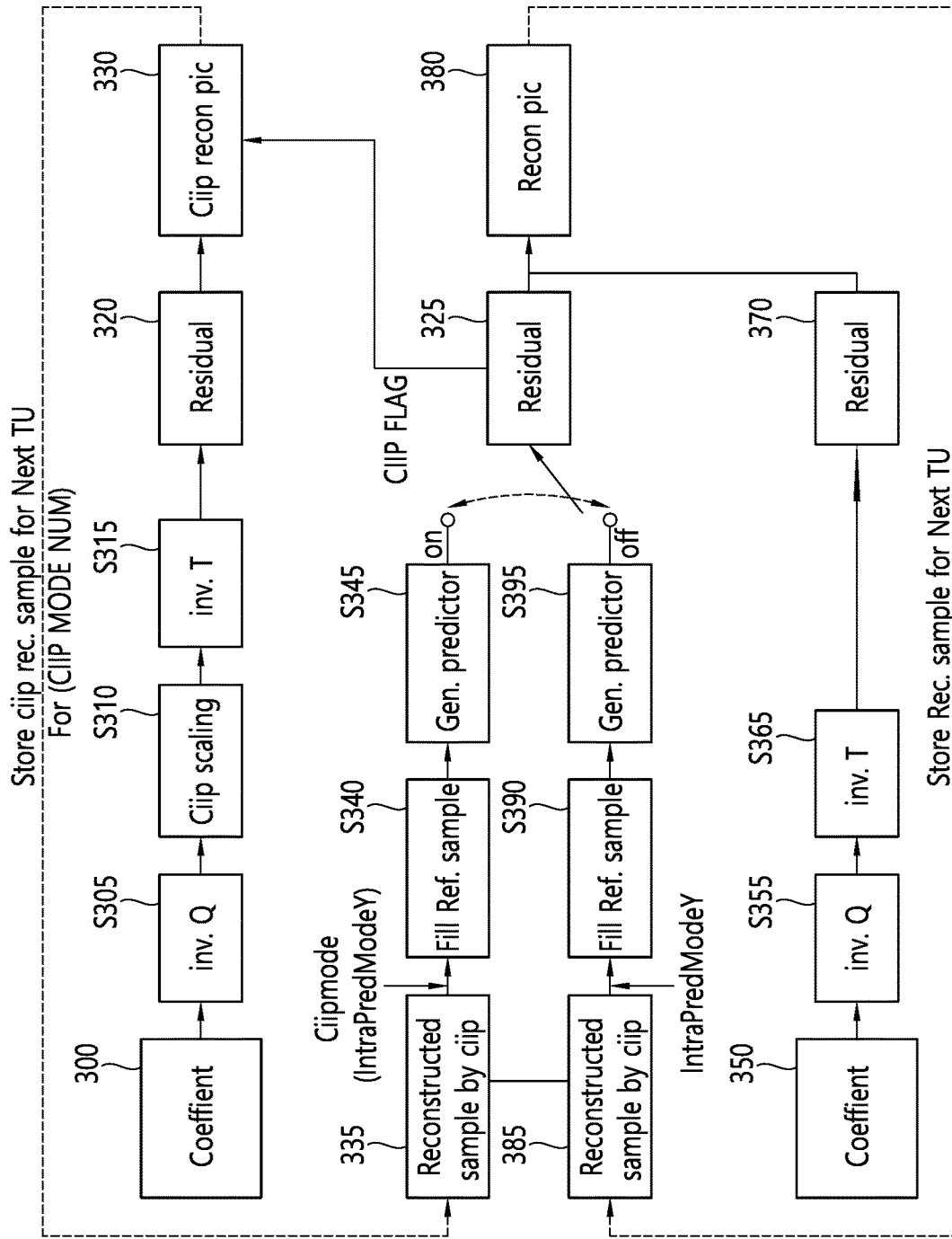
FIG. 3 is a schematic view showing an intra prediction method considering coefficient induced intra prediction (CIIP).

FIG. 3 is a schematic view showing an intra prediction method considering CIIP. A procedure of FIG. 3 may be performed by a coding device. The coding device may include an encoding device or a decoding device.

Referring to FIG. 3, the coding device may perform intra prediction on a current block according to a different procedure depending on whether to apply CIIP.

First, when the CIIP is applied to the current block, the coding device derives transform coefficients by inversely quantizing quantized transform coefficients 300 of a neighboring block (S305), and applies CIIP scaling to the transform coefficients (S310). In this case, as described above, the coding device may apply a predetermined scaling mask to the transform coefficients.

The coding device inversely transforms the transform coefficients subjected to the CIIP scaling (S315), and derives a modified residual sample 320. The coding device may generate a CIIP reconstructed picture 330 on the basis of a predictor 325 of the neighboring block and a modified residual sample 320. The predictor 325 may be called a prediction sample. Herein, in obtaining of the predictor 325 of the neighboring block, CIIP may not be applied to the neighboring block. That is, the predictor 325 of the neighboring block may be generated through a normal intra prediction method to which the CIIP is not applied. In addition, herein, the CIIP reconstructed picture 330 includes a CIIP reconstructed sample 335. The coding device derives a neighboring reference sample (modified neighboring sample) of the current block on the basis of the CIIP reconstructed sample 335 (S340). The coding device may generate a predictor, i.e., a prediction sample, of the current block according to an intra prediction mode of the current block on the basis of the derived neighboring reference sample (S345). The CIIP reconstructed sample 335 used as the neighboring reference sample of the current block may be divided into a CIIP horizontal, a CIIP vertical, and a CIIP diagonal according to the intra prediction mode. That is, when the intra prediction module of the current block is one of a plurality of directivity prediction modes, the CIIP reconstructed sample 335 may be used as a (CIIP) reference sample for the current block of a category to which a directivity prediction mode of the current block belongs. In addition, the generating of the CIIP reconstructed sample includes a process of performing inverse transform after applying a filter to an inverse quantization coefficient as described above. The filter has a form of a scaling mask, and a filter classified into three categories in the neighboring block is applied, followed by a process of generating a reconstructed sample, and thus generating a reconstructed sample.

Meanwhile, when the CIIP is not applied to the current block, the coding device derives transform coefficients by inversely quantizing quantized transform coefficients 350 of the neighboring block (S355), and inversely transforms the transform coefficients (S365) to derive a residual sample 370. In this case, the coding device does not apply a CIIP scaling procedure to the transform coefficients. The coding device may generate a reconstructed picture 380 on the basis of the predictor 325 of the neighboring block and the residual sample 370. The reconstructed sample 380 includes a reconstructed sample 385. The coding device derives a neighboring reference sample (neighboring sample) of the current block on the basis of the reconstructed sample 385 (S390). The coding device may generate a predictor of the current block according to an intra prediction mode of the current block on the basis of the derived reference sample (S395).

In the performing of the intra prediction mode, a specific intra prediction mode (e.g., a DC mode, a planar mode, a directivity (angular) mode, etc.) may be determined in a PU, and a procedure of generating a prediction sample on the basis of neighboring reference samples may be performed in a TU. When intra prediction is applied to the PU, a region of the PU may include a region of one or more TUs. In this case, the one or more TUs may share the same intra prediction mode.

A CIIP method according to the present invention may also be performed efficiently in a block structure having a quad tree form. For example, CIIP-related information may be signaled from an encoding device to a decoding device through a syntax as follows.

TABLE 1

```
seq_parameter_set_rbsp( ) {
    sps_video_parameter_set_id
    sps_max_sub_layers_minus1
    sps_temporal_id_nesting_flag
    profile_tier_level( sps_max_sub_layers_minus1 )
    sps_seq_parameter_set_id
    chroma_format_idc
    if( chroma_format_idc = = 3 )
        separate_colour_plane_flag
    pic_width_in_luma_samples
    pic_height_in_luma_samples
    conformance_window_flag
    if( conformance_window_flag ) {
        conf_win_left_offset
        conf_win_right_offset
        conf_win_top_offset
        conf_win_bottom_offset
    }
    bit_depth_luma_minus8
    bit_depth_chroma_minus8
    log2_max_pic_order_cnt_lsb_minus4
    sps_sub_layer_ordering_info_present_flag
    for( i = ( sps_sub_layer_ordering_info_present_flag ?
        0 : sps_max_sub_layers_minus1 );
            i <= sps_max_sub_layers_minus1; i++) {
        sps_max_dec_pic_buffering_minus1[ i ]
        sps_max_num_reorder_pics[ i ]
        sps_max_latency_increase_plus1[ i ]
    }
```

TABLE 1-continued

```
    log2_min_luma_coding_block_size_minus3
    log2_diff_max_min_luma_coding_block_size
    log2_min_transform_block_size_minus2
    log2_diff_max_min_transform_block_size
    max_transform_hierarchy_depth_inter
    max_transform_hierarchy_depth_intra
    scaling_list_enabled_flag
    if( scaling_list_enabled_flag ) {
        sps_scaling_list_data_present_flag
        if( sps_scaling_list_data_present_flag )
            scaling_list_data( )
    }
    amp_enabled_flag
    sample_adaptive_offset_enabled_flag
```

TABLE 2

```
    pcm_enabled_flag
    if( pcm_enabled_flag ) {
        pcm_sample_bit_depth_luma_minus1
        pcm_sample_bit_depth_chroma_minus1
        log2_min_pcm_luma_coding_block_size_minus3
        log2_diff_max_min_pcm_luma_coding_block_size
        pcm_loop_filter_disabled_flag
    }
    num_short_term_ref_pic_sets
    for( i = 0; i < num_short_term_ref_pic_sets; i++)
        short_term_ref_pic_set( i )
    long_term_ref_pics_present_flag
    if( long_term_ref_pics_present_flag ) {
        num_long_term_ref_pics_sps
        for( i = 0; i < num_long_term_ref_pics_sps; i++ ) {
            lt_ref_pic_poc_lsb_sps[ i ]
            used_by_curr_pic_lt_sps_flag[ i ]
        }
    }
    sps_temporal_mvp_enabled_flag
    strong_intra_smoothing_enabled_flag
    ciip_enabled_flag
    if( ciip_enabled_flag){
        maximum_ciip_enabled_depth
        minimum_ciip_enabled_depth
    }
    vui_parameters_present_flag
    if( vui_parameters_present_flag )
        vui_parameters( )
    sps_extension_flag
    if( sps_extension_flag )
        while( more_rbsp_data( ) )
            sps_extension_data_flag
    rbsp_trailing_bits( )
}
```

Tables 1 and 2 above show an example of a sequence parameter set (SPS) syntax. The syntax of Table 1 and Table 2 may be included in one SPS syntax. Syntax elements included in Table 2 may be signaled subsequent to syntax elements included in Table 1.

The CIIP-related information may include at least one of CIIP available flag information, maximum CIIP available depth information, and minimum CIIP available depth information. As shown in Tables 1 and 2 above, the CIIP available flag information may be expressed in a form of a syntax element ciip_enabled_flag. The CIIP available flag information may be called CIIP flag information, and may be expressed in a form of a syntax element ciip_flag.

The maximum CIIP available depth information may be expressed in a form of a syntax element maximum_ciip_enabled_depth, and the minimum CIIP available depth information may be expressed in a form of a syntax element minimum_ciip_enabled_depth. For example, the maximum CIIP available depth information and the minimum CIIP available depth information may be signaled only when a value of the CIIP available flag information is 1.

A size of a block for applying CIIP scaling according to the present invention may be determined based on at least one of the maximum CIIP available depth information and the minimum CIIP available depth information. That is, whether to apply the CIIP according to the present invention may be determined based on a size of a target block as well as the CIIP available flag information.

In addition, the size of the block for which the CIIP scaling according to the present invention is available may be determined based on at least one of minimum CIIP available block size information and CIIP available block size differential information described below. That is, the CIIP-related information may include the minimum CIIP available block size information and the CIIP available block size differential information. For example, the CIIP-related information may include the minimum CIIP available block size information and the CIIP available block size differential information in addition to the maximum CIIP available depth information and the minimum CIIP available depth information. For another example, the CIIP-related information may include the minimum CIIP available block size information and the CIIP available block size differential information instead of the maximum CIIP available depth information and the minimum CIIP available depth information.

Semantics for the minimum CIIP available block size information and the CIIP available block size differential information may be expressed, for example, by the following table.

TABLE 3 log2_min_ciip_enabled_blk_size_minus2 plus 2 specifies the minimum ciip block size.
The variable Log2MinCiipBlkSize is set equal to log2_min_ciip_enabled_blk_size+ 2. The bitstream shall not contain data that result in Log2MinCiipBlkSize smaller than Log2MinTrafoSize.
log2_diff_max_min_ciip_enabled_blk_size specifies the difference between the maximum and minimum ciip enabled block size.
The variable Log2MaxCiipBlkSize is set equal to log2_min_ciip_enabled_blk_size_minus2 + 2 + log2_diff_max_min_ciip_enabled_blk_size.
The bitstream shall not contain data that result in Log2MaxCiipBlkSize greater than Log2MaxTrafoSize.

Referring to Table 3, the minimum CIIP available block size information may correspond to log 2_min_ciip_enabled_blk_size_minus2, and the CIIP available block size differential information may correspond to log 2_diff_max_min_ciip_enabled_blk_size. MaxCiipBlkSize and MinCiipBlkSize respectively denote CIIP available maximum and minimum block sizes.

Specifically, for example, the applying of the CIIP according to the present invention may be performed based on the following flowchart.

Figure 4:
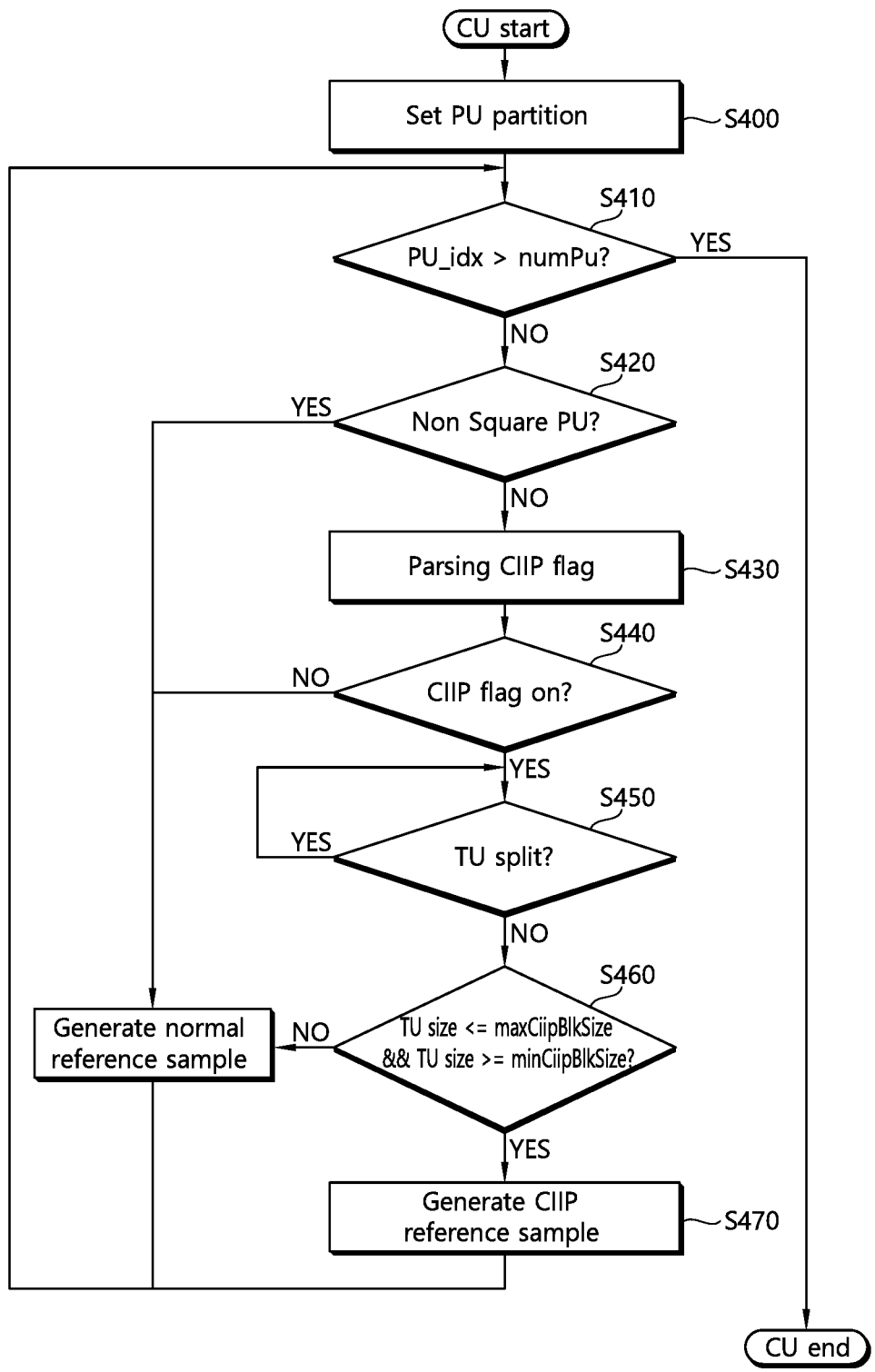
FIG. 4 shows an exemplary procedure for generating a neighboring reference sample for intra prediction according to whether CIIP performed in a decoding device is available.

FIG. 4 shows an exemplary procedure for generating a neighboring reference sample for intra prediction according to whether CIIP performed in a decoding device is available. A current block according to the present invention may correspond to at least one of a CU, a PU, and a TU.

Referring to FIG. 4, the decoding device performs PU partitioning from the CU (S400). The decoding device may derive one or more PUs from the CU on the basis of partition mode information signaled from, for example, an encoding device.

For the derived PU, the decoding device identifies whether an index of the PU is greater than numPU (S410). The numPU may denote the number of PUs in the CU. If the index for the PUs in the CU starts from 0, the numPU may correspond to the number of PUs (i.e., -1) in the CU.

If the index of the PU is greater than numPU in the step S410, it can be regarded that up to a last PU is completely processed, and it can be determined that a procedure of generating a neighboring reference sample according to the present invention is entirely complete.

If the index of the PU is not greater than numPU in the step S410, the decoding device identifies whether the PU is a non-square PU (S420). CIIP flag information may be transmitted on a PU basis, and if a PU constituting the CU is a non-square type, it may be determined that a CIIP reference sample according to the present invention is not used as a neighboring reference sample in the intra prediction. Therefore, if the PU is the non-square PU in the step S420, the decoding device derives normal neighboring reference samples for the conventional intra prediction (S480). Herein, the CIIP scaling according to the present invention is not applied in the deriving of the normal neighboring reference samples.

If the PU is not the non-square PU in the step S420, the decoding device parses and identifies a CIIP flag (S430). The decoding device may determine whether to apply CIIP to the PU (and TUs in the PU region) on the basis of the CIIP flag.

If the CIIP flat is off, that is, if the CIIP flag has a value of 0, the decoding device may perform the step S480 for deriving the normal reference samples for the conventional intra prediction.

If the CIIP flag is on, that is, if the CIIP flag has a value of 1, the decoding device derives at least one TU in the PU region (S450). In this case, the decoding device may derive one or a plurality of TUs through a recursive TU split procedure.

For a TU which is no longer split, the decoding device determines whether a size of the TU belongs to a range of a predeterminesize (S460). That is, the decoding device may determine whether the size of the TU belongs to a range of maxCiipBlkSize and minClipBlkSize. If the size of the TU is greater than axCiipBlkSize or less than minClipBlkSize, the decoding device may perform the step S480 for deriving the normal neighboring reference samples for the conventional intra prediction.

Meanwhile, if the size of the TU is less than or equal to maxCiipBlkSize and greater than or equal to minCiipBlkSize, the CIIP reference sample may be derived by applying a CIIP scaling mask to a neighboring block (S470). The decoding device may perform inter-prediction by using the CIIP reference sample as the neighboring reference sample.

Although the determination steps S410, S420, S440, S450, and S460 of FIG. 4 are illustrated as a series of steps, at least one of the steps may be omitted.

Meanwhile, in residual coding, a residual for a neighboring block of the current block may be coded with a transform kernel different from that of a residual for the current block. The CIIP scaling method according to the present invention may also be applied not only to a case where the same transform kernel is applied to the neighboring block and the current block but also to a case where different transform kernels are applied thereto. The CIIP scaling mask according to the present invention may be determined based on, for example, a transform kernel and an intra prediction mode of the current block.

Figure 5:
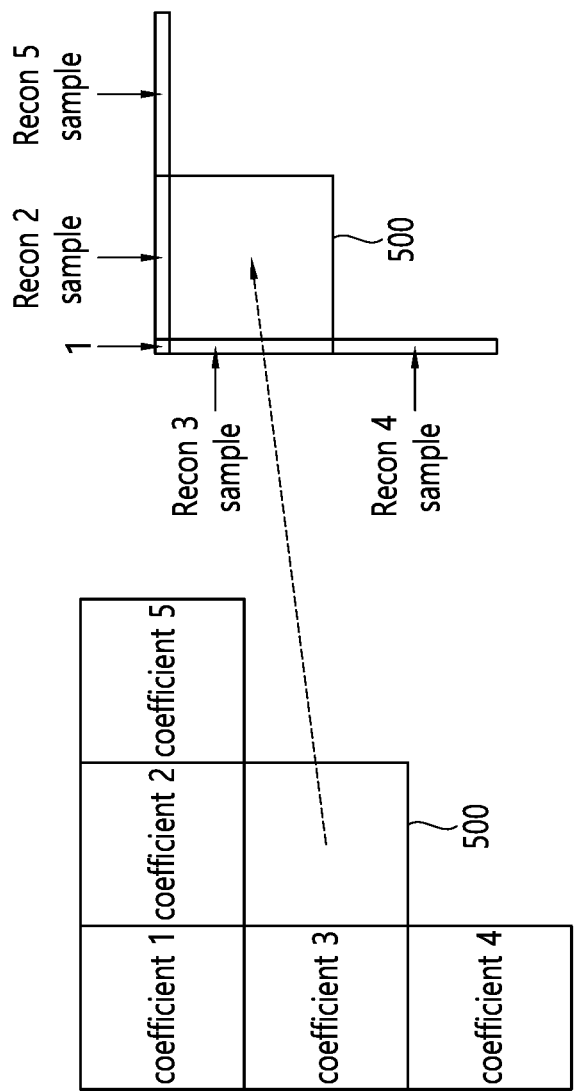
FIG. 5 shows an exemplary relation with a neighboring block when a CIIP reference sample is generated according to the present invention.

FIG. 5 shows an exemplary relation with a neighboring block when a CIIP reference sample is generated according to the present invention.

Referring to FIG. 5, if a current block 500 is a CIIP-applied block, a modified residual sample is generated in such a manner that a quantized transform coefficient of the neighboring block is inversely quantized, and then is inversely transformed after applying a scaling mask to the transform coefficient. A CIIP reconstructed sample is generated based on the modified residual sample. The CIIP reconstructed sample is used as the CIIP reference sample.

Since various intra prediction modes and transform kernels are used, a type of a transform kernel used to generate the scaling mask may not be matched to a type of a transform kernel used after the scaling mask is applied, which may result in deterioration of performance improvement. To solve this problem, according to the present invention, the scaling mask may be determined and used according to the type of the transform kernel of the neighboring block. That is, the scaling mask according to the present invention may be a filter learned through offline according to the intra prediction mode and the type of the transform kernel. That is, the scaling mask may be adaptively determined according to the intra prediction mode and the type of the transform kernel.

Figure 6:
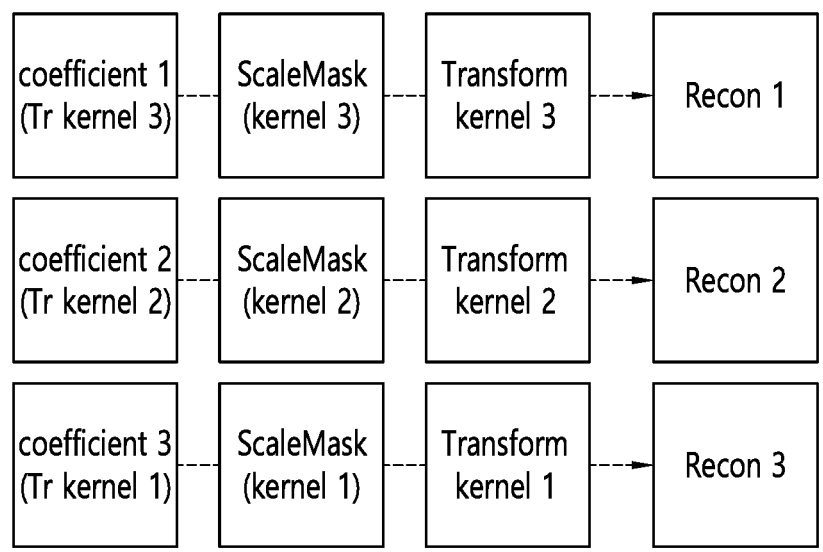
FIG. 6 shows an exemplary method of generating a CIIP reference sample considering a transform kernel according to the present invention.

FIG. 6 shows an exemplary method of generating a CIIP reference sample considering a transform kernel according to the present invention.

Referring to FIG. 6, a scaling mask may be determined and used according to a type of a transform kernel of a neighboring block. In this case, a type of a transform kernel used when the scaling mask is generated in the learning process may be allowed to be matched to a type of a transform kernel used when the scaling mask is actually applied, thereby solving the mismatch problem between learning and test processes.

Figure 7:
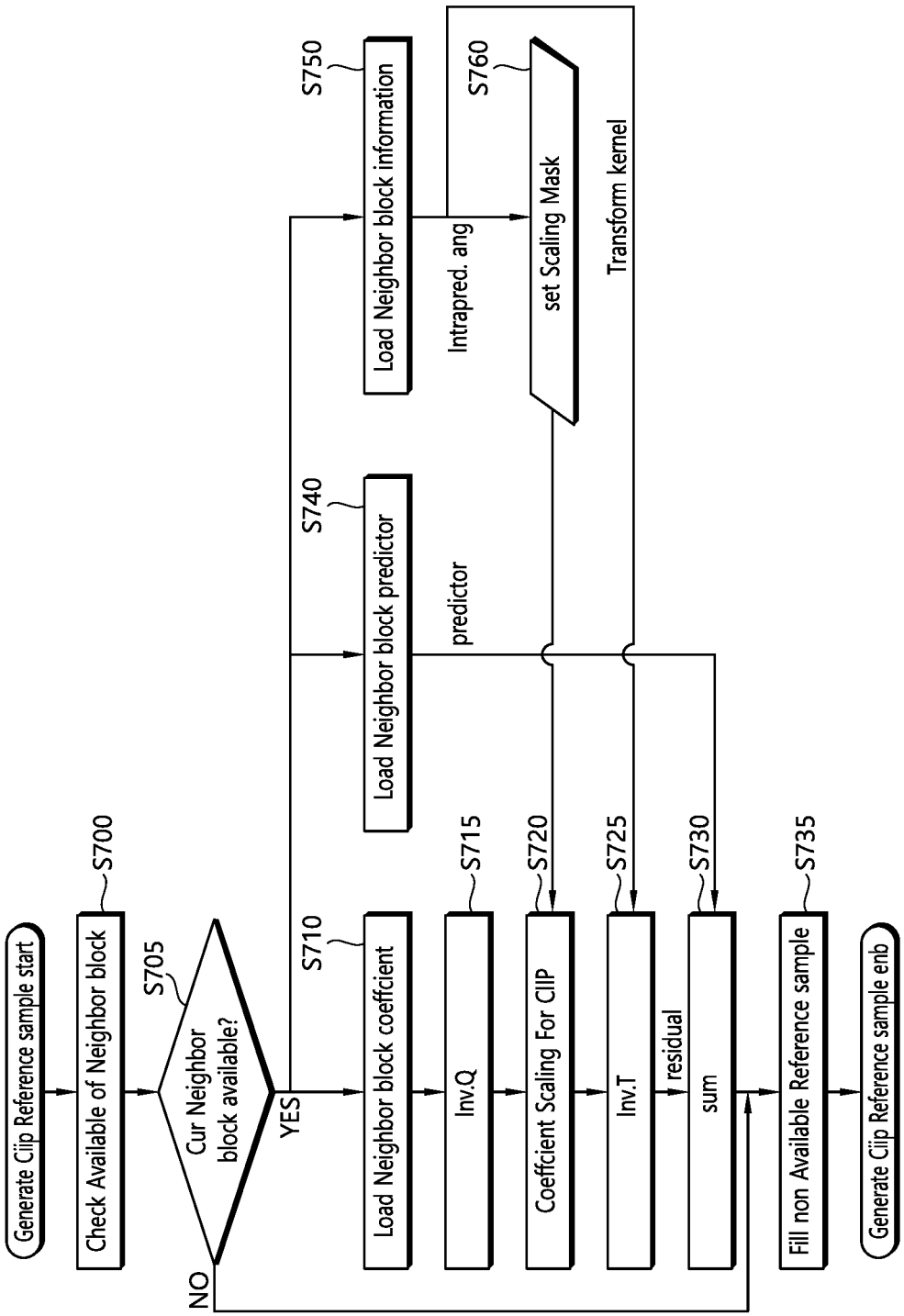
FIG. 7 shows an exemplary procedure of generating a CIIP reference sample when CIIP is applied to a current block.

FIG. 7 shows an exemplary procedure of generating a CIIP reference sample when CIIP is applied to a current block. The method of FIG. 7 may be performed by a coding device, and the coding device may include an encoding device or a decoding device.

Referring to FIG. 7, the coding device checks whether a neighboring block of a current block is available (S700). That is, the coding device identifies whether the neighboring block can be referred. For example, when the neighboring block is located outside a current picture or is located in a slice or tile different from that of the current block, it may be determined that the neighboring block is not available. Alternatively, when there is no residual for the neighboring block similarly to a case where the neighboring block is coded in a skip mode, it may be determined that the neighboring block is not available.

The coding device identifies whether the neighboring block is available (S705), and if the neighboring block is available, derives quantized transform coefficients for the neighboring block (S710), derives prediction samples of the neighboring block (S740), and derives coding information on the neighboring block (S750). Herein, the coding information may include an intra prediction mode for the neighboring block and a transform kernel. The prediction samples are derived based on an intra prediction mode, and the quantized transform coefficients are generated based on the transform kernel. A scaling mask is set based on the intra prediction mode for the neighboring block and the transform kernel (S760). Herein, the transform kernel may be used in an inverse quantization step (S725).

The coding device derives transform coefficients by inversely quantizing quantized transform coefficients for the neighboring block (S715). The coding device applies CIIP scaling to the transform coefficients (S720). In this case, as described above, the coding device may apply the scaling mask, which is determined based on the intra prediction mode of the neighboring block and the transform kernel in the step S760, to the transform coefficients. The coding device derives modified residual samples for the neighboring block by inversely transforming the transform coefficients subjected to CIIP scaling (S725). The coding device generates modified reconstructed samples (CIIP reconstructed samples) for the neighboring block by adding modified residual samples for the neighboring block, derived based on step S725, and prediction samples for the neighboring block, derived based on the step S740, according to a sample position (topology) (S730).

The coding device derives neighboring reference samples for intra prediction of the current block on the basis of modified reconstructed samples for the neighboring block, and if at least one of the neighboring reference samples is not available, fills a non-available neighboring reference sample by performing padding based on an available neighboring reference sample (S735).

For example, a plurality of neighboring blocks may be considered to derive the neighboring reference samples for the current block. In this case, a CIIP reconstructed sample may be generated in some neighboring blocks, but the CIIP reconstructed sample may not be generated. Specifically, for example, when CIIP is applied to a quad-tree block structure, the CIIP reconstructed sample may not be generated by applying the CIIP scaling mask to the neighboring block if inter prediction is applied to a neighboring block with respect to a current block or if the neighboring block corresponds to a block having a size exceeding a size applicable to a CIIP scaling mask defined in a higher layer such as SPS or a slice header. This may be a problem when deriving a neighboring block sample of a current block for which CIIP is available. To solve this problem, a neighboring reference sample may be filled based on the following method.

Figure 8:
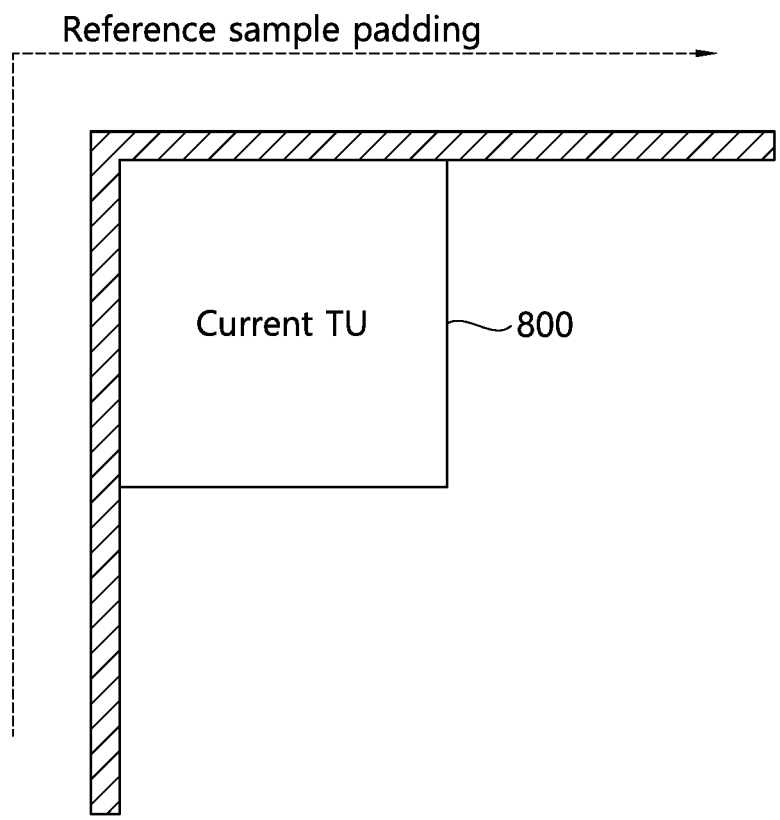
FIG. 8 shows an exemplary method of padding a neighboring reference sample.

FIG. 8 shows an exemplary method of padding a neighboring reference sample.

Referring to FIG. 8, in deriving of neighboring reference samples of a current block 800, non-available neighboring reference samples may be filled with available reference samples. In this case, a padding procedure may be performed in which, while checking availability in a search order indicated by an arrow direction in FIG. 8, when detecting the non-available neighboring reference sample, an immediately previous neighboring reference sample is copied based on the search order and is filled to the non-available neighboring reference sample.

In addition, the CIIP scaling mask may not be usable. Such a case may include a case where a size of a TU which is a neighboring block exceeds a permitted range as described above or a case where the TU belongs to a non-square PU. In this case, before performing the padding procedure, normal reconstructed samples of the neighboring block may be filled with available neighboring reference samples for the current block. For example, if the CIIP scaling mask is usable in a first neighboring block, a CIIP reconstructed sample for the first neighboring block may be generated, and if the CIIP scaling mask is not usable in a second neighboring block, a normal reconstructed sample for the second neighboring block may be generated. Neighboring reference samples of the current block may be derived based on a CIIP reconstructed sample for the first neighboring block and a normal reconstructed sample for the second neighboring block. Thereafter, the aforementioned padding procedure may also be performed on still non-available neighboring reference samples.

In this case, a process of deriving some neighboring reference samples for the current block by generating a normal reconstructed sample for a neighboring block which cannot use the CIIP scaling mask may be performed for example as follows.

Figure 9:
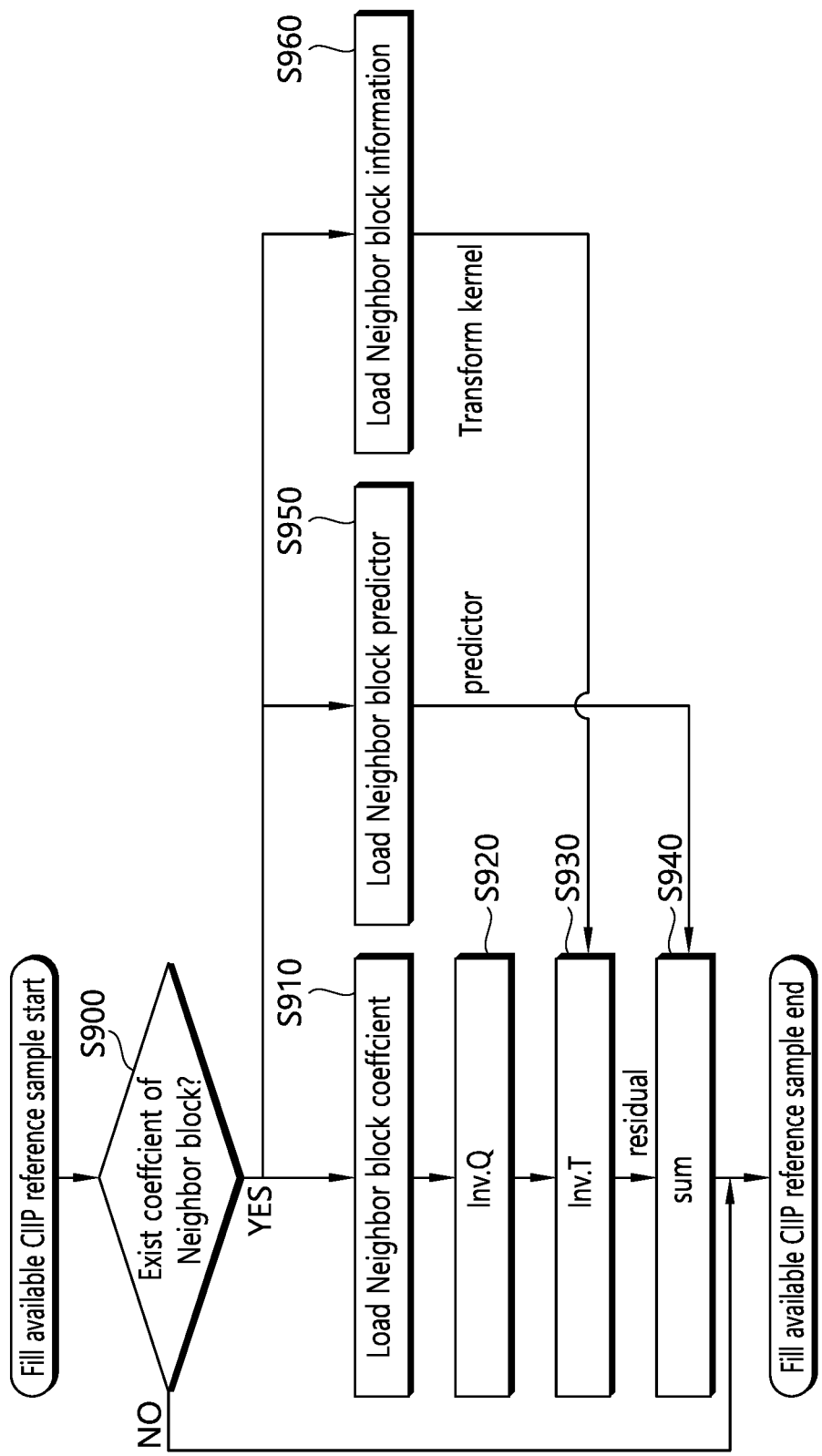
FIG. 9 shows an exemplary method of deriving some neighboring reference samples for a current block on the basis of a normal reconstructed sample for a neighboring block which cannot use a CIIP scaling mask.

FIG. 9 shows an exemplary method of deriving some neighboring reference samples for a current block on the basis of a normal reconstructed sample for a neighboring block which cannot use a CIIP scaling mask.

Referring to FIG. 9, a coding device identifies whether a transform coefficient exists in a neighboring block (S900). Herein, whether the transform coefficient exists in the neighboring block may imply whether a non-zero transform coefficient exists in the neighboring block. If the non-zero transform coefficient exists in the neighboring block, the coding device may determine that CIIP scaling is usable (applicable) for the neighboring block.

If the transform coefficient exists in the neighboring block in the step S900, quantized transform coefficients for the neighboring block are derived (S910), prediction samples of the neighboring block are derived (S950), and coding information for the neighboring block is derived (S960). Herein, the coding information may include a transform kernel for the neighboring block. Herein, the transform kernel may be used in an inverse quantization step S930.

The coding device derives transform coefficients by inversely quantizing the quantized transform coefficients for the neighboring block (S920). The coding device derives (normal) residual samples for the neighboring block by inversely transforming the transform coefficients (S930). The coding device generates (normal) reconstructed samples for the neighboring block by adding (normal) residual samples for the neighboring block, derived based on step S930, and prediction samples for the neighboring block, derived based on the step S960, according to a sample position (topology) (S940).

If the transform coefficient does not exist in the neighboring block in the step S900, neighboring reference samples of the current block belonging to a corresponding neighboring block portion may be derived based on the aforementioned padding procedure.

The aforementioned intra prediction method according to the present invention may be performed, for example, based on the following flowchart.

Figure 10:
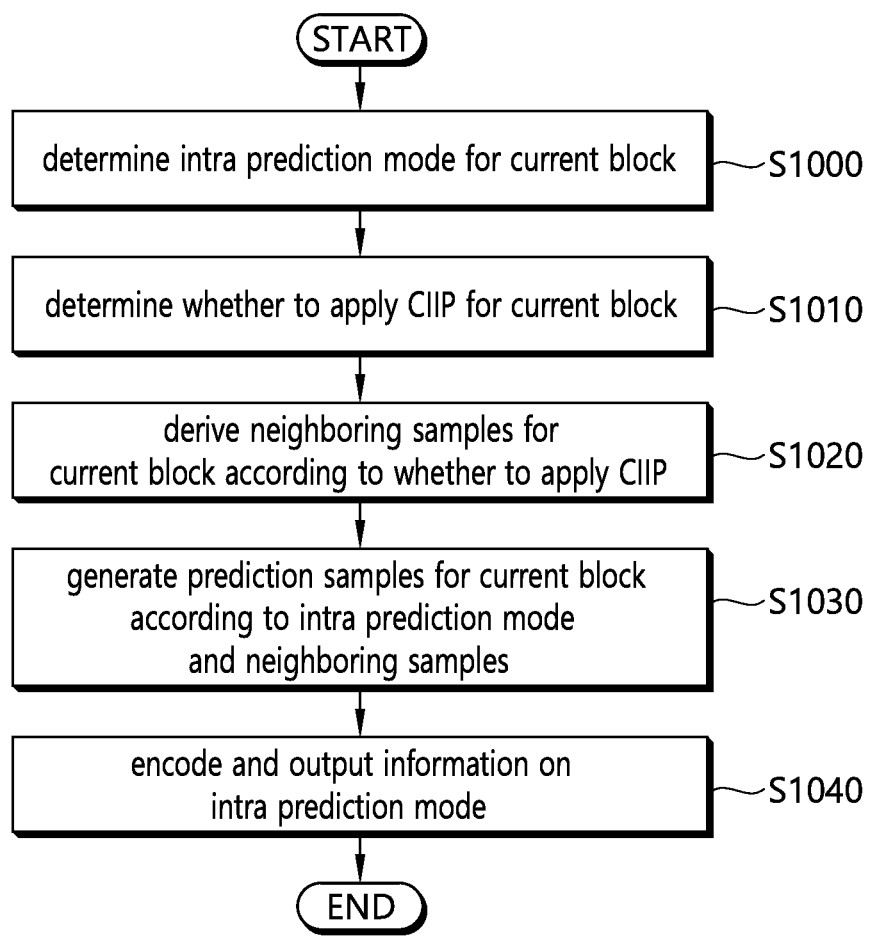
FIG. 10 is a schematic view showing an example of an intra prediction method performed by an encoding device according to the present invention.

FIG. 10 is a schematic view showing an example of an intra prediction method performed by an encoding device according to the present invention. The method of FIG. 10 may be performed by the encoding device of FIG. 1. Specifically, for example, S1000 to S1030 of FIG. 10 may be performed by a predictor of the encoding device, and S1040 may be performed by an entropy encoder of the encoding device.

Referring to FIG. 10, the encoding device determines an intra prediction mode for a current block (S1000). Herein, the intra prediction mode may be any one of a DC mode, a planar mode, and an angular mode. Herein, the current block may correspond to a current TU. For example, at least one PU and at least one TU may be derived from a current CU. In this case, one or a plurality of TUs may exist in a region of the PU. For example, an inter/intra prediction type may be determined in the current CU, and a specific intra prediction mode may be determined in the PU. In this case, the TUs in the PU region may share the determined intra prediction mode. The encoding device may determine an optimal intra prediction mode on the basis of a rate-distortion (RD) cost.

The encoding device determines whether to apply CIIP to the current block (S1010). The encoding device may determine whether to apply the CIIP to the current block on the basis of the RD cost. In this case, the encoding device may generate a CIIP available flag indicating whether to apply the CIIP, and may transmit the CIIP flag to a decoding device through a bit-steam as described below. Meanwhile, according to a specific condition, the RD cost may not be considered when it is determined that the CIIP is not applied to the current block. That is, it may be predetermined that the CIIP is not applied to the current block when the specific condition is satisfied.

For example, the encoding device may determine that the CIIP is applicable to the current block when the current block belongs to a range of a specific size. In this case, the encoding device may generate information on a CIIP available block size and may transmit it to the decoding device through the bit-stream as described below. For example, the information on the CIIP available block size may be received when a value of the CIIP available flag is 1. The information on the CIIP available block size may indicate a maximum block size and a minimum block size for which the CIIP is available.

For another example, the encoding device may determine whether the CIIP is applied to the current block, on the basis of whether the current PU to which the current block belongs is a non-square PU. For example, if the current PU is the non-square PU, the encoding device may determine that the CIIP is not applied to the current block. In this case, the encoding device may not transmit the CIIP available flag to the decoding device.

The encoding device derives neighboring reference samples for the current block (S1020). The encoding device derives the neighboring reference samples of the current block so as to be utilized in intra prediction. For example, if an upper left sample position of the current block is (0, 0) and if the current block has a height H and a width W, the neighboring reference samples may include samples of up to (−1, 2 N−1) . . . (−1, −1) and (0, −1) . . . (2 N−1, −1).

Specifically, for example, the encoding device may acquire quantized transform coefficients for the neighboring block, and may acquire transform coefficients by inversely quantizing the quantized transform coefficients. The encoding device may derive residual samples or modified residual samples on the basis of the transform coefficients.

If the CIIP is not applied to the current block, the encoding device may derive the residual samples by inversely transforming the transform coefficients.

If the CIIP is applied to the current block, the encoding device may derive the modified residual samples by inversely transforming transform coefficients subjected to CIIP scaling after a CIIP scaling procedure is performed on the transform coefficients. In this case, the CIIP scaling procedure may be performed based on a scaling matrix. The scaling matrix may be determined according to the intra prediction mode for the neighboring block and a transform kernel. The transform coefficients subjected to the CIIP scaling may be inversely transformed based on the transform kernel.

The encoding device may derive the neighboring reference samples on the basis of the residual samples or the modified residual samples.

For another example, the encoding device may derive neighboring reference samples for the current block on the basis of modified reconstructed samples for a first neighboring block and reconstructed samples for a second neighboring block. In this case, first quantized transform coefficients may be acquired for the first neighboring block. Second quantized transform coefficients may be acquired for the second neighboring block. First transform coefficients may be acquired by inversely quantizing the first quantized transform coefficients. Second transform coefficients may be acquired by inversely quantizing the second quantized transform coefficients. Transform coefficients subjected to CIIP scaling may be derived by performing a CIIP scaling procedure on the first transform coefficients. Modified residual samples may be derived by inversely transforming the transform coefficients subjected to CIIP scaling. Residual samples may be derived by inversely transforming the second transform coefficients. The modified reconstructed samples may be derived for the first neighboring block on the basis of the modified residual samples. The reconstructed samples for the second neighboring block may be derived on the basis of the residual samples.

Meanwhile, if there is a non-available neighboring reference sample among the neighboring reference samples for the current block, as exemplified in FIG. 8, the encoding device may copy a previous available neighboring reference sample on the basis of a predetermined search order to perform padding on the non-available neighboring reference sample.

The encoding device may generate prediction samples for the current block on the basis of the intra prediction mode and the neighboring reference samples (S1030). The encoding device may generate the prediction samples by using all or some of the neighboring samples according to the intra prediction mode.

The encoding device encodes and outputs information on the intra prediction mode (S3140). The encoding device may encode and output the information on the intra prediction mode in a form of a bit-stream. The bit-stream may be transmitted to the decoding device through a network or a storage medium. In addition, the encoding device may encode information on a residual for the current block and output it in the bit-stream form. The information on the residual for the current block may include quantized transform coefficients regarding residual samples for the current block.

Meanwhile, the encoding device may encode information on the generated CIIP available flag and the CIIP available block size and may output it in the bit-stream form.

Figure 11:
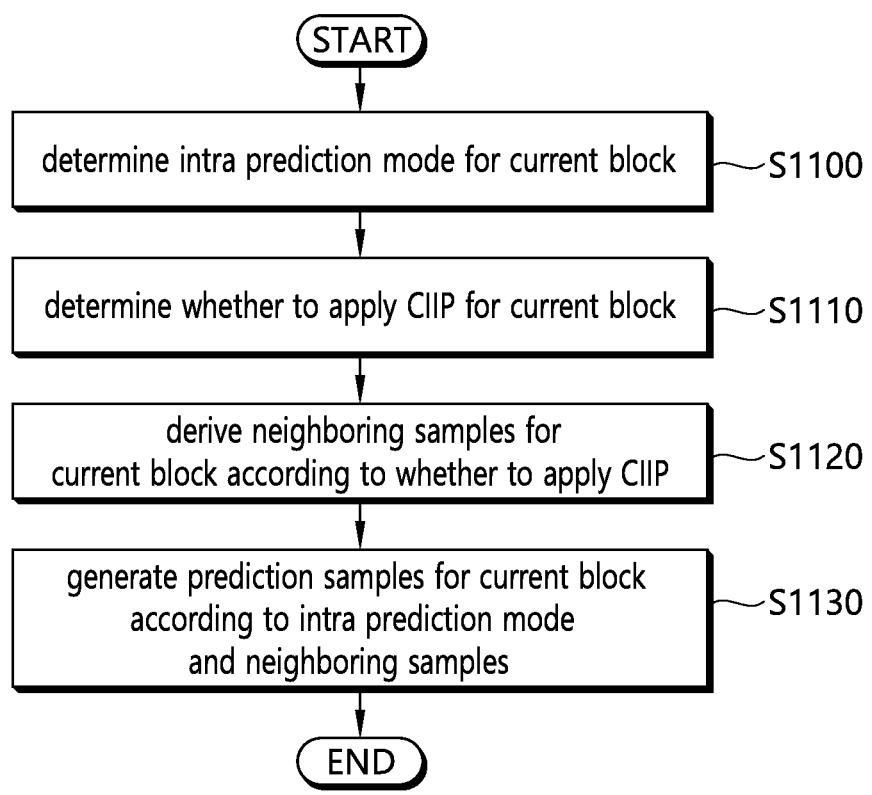
FIG. 11 is a schematic view showing an example of an intra prediction method performed by a decoding device according to the present invention.

FIG. 11 is a schematic view showing an example of an intra prediction method performed by a decoding device according to the present invention. The method of FIG. 11 may be performed by the decoding device of FIG. 2. Specifically, for example, S1100 to S1130 of FIG. 11 may be performed by a predictor of the decoding device.

Referring to FIG. 11, the decoding device determines an intra prediction mode for a current block (S1100). Herein, the intra prediction mode may be any one of a DC mode, a planar mode, and an angular mode. Herein, the current block may correspond to a current TU. For example, at least one PU and at least one TU may be derived from a current CU. In this case, one or a plurality of TUs may exist in a region of the PU. For example, an inter/intra prediction type may be determined in the current CU, and a specific intra prediction mode may be determined in the PU. In this case, the TUs in the PU region may share the determined intra prediction mode.

The decoding device may acquire information on an intra prediction mode through a bit-stream. The decoding device may decode the bit-stream received from the encoding device, and may acquire the information on the intra prediction mode. The bit-stream may be received through a network or a storage medium. The decoding device may further receiver at least one of information on a CIIP available flag and information on a CIIP available block size through the bit-stream. For example, the information on the CIIP available block size may be received when a value of the CIIP available flag is 1. The information on the CIIP available block size may indicate a maximum block size and a minimum block size for which the CIIP is available.

The decoding device determines whether to apply CIIP to the current block (S1110). The decoding device may parse or acquire the CIIP available flag from the bit-stream, and may determine whether to apply the CIIP to the current block on the basis of the CIIP flag. In addition, according to a specific condition, the CIIP available flag may not be received or parsed when it is determined or induced that the CIIP is not applied to the current block. That is, it may be predetermined that the CIIP is not applied to the current block when the specific condition is satisfied.

For example, the decoding device may determine that the CIIP is applicable to the current block when the current block belongs to a range of a specific size. The information on the CIIP available block size may indicate a maximum block size and a minimum block size for which the CIIP is available. If a size of the current block belongs to a range of the maximum block size and the minimum block size, the decoding device may determine that the CIIP is applied to the current block.

For another example, the decoding device may determine whether the CIIP is applied to the current block, on the basis of whether the current PU to which the current block belongs is a non-square PU. For example, if the current PU is the non-square PU, the decoding device may determine that the CIIP is not applied to the current block. In this case, the decoding device may not receive the CIIP available flag.

The decoding device derives neighboring reference samples for the current block (S1120). The decoding device derives the neighboring reference samples of the current block so as to be utilized in intra prediction. For example, if an upper left sample position of the current block is (0, 0) and if the current block has a height H and a width W, the neighboring reference samples may include samples of up to $(-1, 2N-1) \ldots (-1, -1)$, and $(0, -1) \ldots (2N-1, -1)$.

Specifically, for example, the decoding device may acquire quantized transform coefficients for the neighboring block, and may acquire transform coefficients by inversely quantizing the quantized transform coefficients. The decoding device may derive residual samples or modified residual samples on the basis of the transform coefficients. If the CIIP is not applied to the current block, the decoding device may derive the residual samples by inversely transforming the transform coefficients. If the CIIP is applied to the current block, the decoding device may derive the modified residual samples by inversely transforming transform coefficients subjected to CIIP scaling after a CIIP scaling procedure is performed on the transform coefficients. In this case, the CIIP scaling procedure may be performed based on a scaling matrix. The scaling matrix may be determined according to the intra prediction mode for the neighboring block and a transform kernel. The transform coefficients subjected to the CIIP scaling may be inversely transformed based on the transform kernel. The decoding device may derive the neighboring reference samples on the basis of the residual samples or the modified residual samples.

For another example, the decoding device may derive neighboring reference samples for the current block on the basis of modified reconstructed samples for a first neighboring block and reconstructed samples for a second neighboring block. In this case, first quantized transform coefficients may be acquired for the first neighboring block.

Second quantized transform coefficients may be acquired for the second neighboring block. First transform coefficients may be acquired by inversely quantizing the first quantized transform coefficients. Second transform coefficients may be acquired by inversely quantizing the second quantized transform coefficients. Transform coefficients subjected to CIIP scaling may be derived by performing a CIIP scaling procedure on the first transform coefficients. Modified residual samples may be derived by inversely transforming the transform coefficients subjected to CIIP scaling. Residual samples may be derived by inversely transforming the second transform coefficients. The modified reconstructed samples may be derived for the first neighboring block on the basis of the modified residual samples. The reconstructed samples for the second neighboring block may be derived on the basis of the residual samples.

Meanwhile, if there is a non-available neighboring reference sample among the neighboring reference samples for the current block, as exemplified in FIG. 8, the decoding device may copy a previous available neighboring reference sample on the basis of a predetermined search order to perform padding on the non-available neighboring reference sample.

The decoding device may generate prediction samples for the current block on the basis of the intra prediction mode and the neighboring reference samples (S1130). The decoding device may generate the prediction samples by using all or some of the neighboring samples according to the intra prediction mode.

The decoding device may acquire information on a residual for the current block from the bit-stream. The decoding device may derive residual samples for the current block on the basis of the information on the residual for the current block, and may generate reconstructed samples on the basis of prediction samples for the current block and the residual samples for the current block. The information on the residual for the current block may include quantized transform coefficients for the current block. The decoding device may generate a reconstructed picture on the basis of the reconstructed samples.

According to the aforementioned present invention, neighboring reference samples suitable for intra prediction of a current block can be derived, thereby improving intra prediction performance.

In addition, according to the present invention, unlike in the conventional technique in which a reconstructed sample of a neighboring block is used as neighboring reference samples for intra prediction of a current sample, modified or improved neighboring reference samples can be generated by applying CIIP scaling to a transform coefficient of the neighboring block, thereby improving intra prediction performance.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An intra prediction method performed by a decoding device, comprising:
   determining an intra prediction mode for a current block;
   determining whether to apply a coefficient induced intra prediction (CIIP) to the current block;
   deriving neighboring reference samples for the current block on the basis of whether to apply the CIIP; and
   generating prediction samples for the current block on the basis of the intra prediction mode and the neighboring reference samples,
   wherein the deriving of the neighboring reference samples comprises:
   acquiring quantized transform coefficients for a neighboring block;
   acquiring transform coefficients by inversely quantizing the quantized transform coefficients;
   deriving residual samples or modified residual samples on the basis of the transform coefficients; and
   deriving the neighboring reference samples on the basis of the residual samples or the modified residual samples,
   wherein if the CIIP is not applied to the current block, the residual samples are derived by inversely transforming the transform coefficients, and
   wherein if the CIIP is applied to the current block, the modified residual samples are derived by inversely transforming transform coefficients subjected to CIIP scaling after a CIIP scaling procedure is performed on the transform coefficients,
   wherein the CIIP scaling procedure is performed based on a scaling matrix, and
   wherein the scaling matrix is determined according to a intra prediction mode for the neighboring block and a transform kernel, and
   wherein the transform coefficients subjected to the CIIP scaling are inversely transformed based on the transform kernel.

2. The intra prediction method of claim 1, further comprising receiving at least one of information on a CIIP available flag and information on a CIIP available block size, wherein whether to apply the CIIP is determined on the basis of at least one of the information on the CIIP available flag and the information on the CIIP available block size.

3. The intra prediction method of claim 2, wherein the information on the CIIP available block size is received when a value of the CIIP available flag is 1.

4. The intra prediction method of claim 2,
   wherein the information on the CIIP available block size indicates a maximum block size and a minimum block size for which the CIIP is available, and wherein if a size of the current block belongs to a range of the maximum block size and the minimum block size, it is determined that the CIIP is applied to the current block.

5. The intra prediction method of claim 1,
wherein the current block corresponds to a transform unit (TU),
wherein the TU is located in a current prediction unit (PU), and
wherein if the current PU is a non-square PU, it is determined that the CIIP is not applied to the current block.

6. The intra prediction method of claim 1,
wherein neighboring reference samples for the current block are derived based on modified reconstructed samples for a first neighboring block and reconstructed samples for a second neighboring block,
wherein the deriving of the neighboring reference samples comprises:
acquiring first quantized transform coefficients for the first neighboring block;
acquiring second quantized transform coefficients for the second neighboring block;
acquiring first transform coefficients by inversely quantizing the first quantized transform coefficients;
acquiring second transform coefficients by inversely quantizing the second quantized transform coefficients;
deriving transform coefficients subjected to CIIP scaling by performing a CIIP scaling procedure on the first transform coefficients;
deriving modified residual samples by inversely transforming the transform coefficients subjected to CIIP scaling;
deriving residual samples by inversely transforming the second transform coefficients;
deriving the modified reconstructed samples for the first neighboring block on the basis of the modified residual samples; and
deriving the reconstructed samples for the second neighboring block on the basis of the residual samples.

7. The intra prediction method of claim 6, wherein if there is a non-available neighboring reference sample among the neighboring reference samples for the current block, a previous available neighboring reference sample is copied based on a predetermined search order to perform padding on the non-available neighboring reference sample.

8. A decoding device for performing intra prediction, comprising:
a predictor for determining an intra prediction mode for a current block, determining whether to apply a coefficient induced intra prediction (CIIP) to the current block, deriving neighboring reference samples for the current block on the basis of whether to apply the CIIP, and generating prediction samples for the current block on the basis of the intra prediction mode and the neighboring reference samples; and
a memory for storing coding information for at least one neighboring block,
wherein the deriving of the neighboring reference samples comprises:
acquiring quantized transform coefficients for a neighboring block;
acquiring transform coefficients by inversely quantizing the quantized transform coefficients;
deriving residual samples or modified residual samples on the basis of the transform coefficients; and
deriving the neighboring reference samples on the basis of the residual samples or the modified residual samples,
wherein if the CIIP is not applied to the current block, the residual samples are derived by inversely transforming the transform coefficients, and
wherein if the CIIP is applied to the current block, the modified residual samples are derived by inversely transforming transform coefficients subjected to CIIP scaling after a CIIP scaling procedure is performed on the transform coefficients,
wherein the CIIP scaling procedure is performed based on a scaling matrix, and
wherein the scaling matrix is determined according to a intra prediction mode for the neighboring block and a transform kernel, and
wherein the transform coefficients subjected to the CIIP scaling are inversely transformed based on the transform kernel.

9. The decoding device of claim 8, further comprising an entropy decoder for receiving at least one of information on a CIIP available flag and information on a CIIP available block size, wherein the predictor determines whether to apply the CIIP on the basis of at least one of the information on the CIIP available flag and the information on the CIIP available block size.

10. The decoding device of claim 9,
wherein the information on the CIIP available block size indicates a maximum block size and a minimum block size for which the CIIP is available, and
wherein the predictor determines that the CIIP is applied to the current block if a size of the current block belongs to a range of the maximum block size and the minimum block size.

* * * * *